United States Patent [19]

Chon

[11] Patent Number: 6,008,861
[45] Date of Patent: Dec. 28, 1999

[54] OSD VERTICAL BLANKING SIGNAL SELECTION CIRCUIT FOR DISPLAY APPARATUS

[75] Inventor: Hyun-Jin Chon, Suwon, Rep. of Korea

[73] Assignee: SamSung Electronics Co., Ltd., Suwon, Rep. of Korea

[21] Appl. No.: 09/066,536

[22] Filed: Apr. 27, 1998

[30] Foreign Application Priority Data

Apr. 26, 1997 [KR] Rep. of Korea ............... 97-8871 U

[51] Int. Cl.$^6$ .................................................. H04N 5/445
[52] U.S. Cl. ........................................ 348/569; 348/567
[58] Field of Search ............................ 348/569, 529, 348/530, 533, 521, 542, 544, 545, 555, 554, 563, 564, 565, 566; 327/99, 407; H04N 5/445

[56] References Cited

U.S. PATENT DOCUMENTS 4,345,246  8/1982  Van den Driessche ............ 340/748
4,460,918  7/1984  Flasza ................................ 358/21

*Primary Examiner*—Nathan Flynn
*Attorney, Agent, or Firm*—Robert E. Bushnell, Esq.

[57] ABSTRACT

An on-screen display (OSD) vertical blanking signal selection circuit for a display apparatus comprises: a microcomputer for generating a reference oscillating signal in response to vertical and horizontal synchronous signals from a video card; an HV processor for generating a flyback transformer (FBT) drive signal and horizontal and vertical drive signals in response to the reference oscillating signal from the microcomputer and the horizontal and vertical synchronous signals from the video card; an FBT for generating a high voltage in response to the FBT drive signal from the HV processor and for supplying the generated high voltage to a cathode ray tube; a horizontal deflection circuit for controlling horizontal deflection of electron beams in a cathode ray tube in response to the horizontal drive signal from the HV processor; a vertical deflection circuit for controlling a vertical deflection of the electron beams in the cathode ray tube in response to the vertical drive signal from the HV processor; and an OSD vertical blanking signal selector for supplying the vertical synchronous signal from the video card or a vertical blanking signal from the vertical deflection circuit as an OSD vertical blanking signal to an OSD circuit in response to a control signal from the microcomputer.

23 Claims, 3 Drawing Sheets

OSD VERTICAL BLANKING SIGNAL SELECTION CIRCUIT FOR DISPLAY APPARATUS

This application makes reference to, incorporates the same herein, and claims all benefits accruing under 35 U.S.C. §119 from an application entitled OSD VERTICAL BLANKING SIGNAL SELECTION CIRCUIT FOR DISPLAY APPARATUS earlier filed in the Korean Industrial Property Office on Apr. 26, 1997, and there duly assigned Ser. No. 97-8871 by that Office.

BACKGROUND OF THE INVENTION

TECHNICAL FIELD

The present invention relates, in general, to selection of an on-screen display (referred to hereinafter as "OSD") vertical blanking signal for displaying an OSD signal in a video scanning interval to perform an OSD function of a display apparatus. More particularly, the invention relates to an OSD vertical blanking signal selection circuit for the display apparatus, which is capable of supplying a vertical synchronous signal from a video card as the OSD vertical blanking signal to an OSD circuit when color signals, a horizontal synchronous signal and the vertical synchronous signal are applied from the video card in a separate form. The circuit is also capable of supplying a vertical blanking signal from a vertical deflection circuit as the OSD vertical blanking signal to the OSD circuit when the color signals, horizontal synchronous signal and vertical synchronous signal are applied from the video card in a composite form.

RELATED ART

Generally, when a display apparatus such as video equipment is operated, the operated and controlled states thereof may often be checked by the user.

For example, if the user sets an ON time and an OFF time of the display apparatus using a timer, the user will check the current time counted by the apparatus and the ON time and OFF time of the apparatus. Also, the user will check the various operating values of the display apparatus.

To this end, the display apparatus may often comprise an OSD circuit for displaying the operated and controlled states of the apparatus on a screen. Also, vertical and horizontal synchronous signals, together with red (R), green (G) and blue (B) signals, must be applied to the display apparatus to operate the apparatus accurately.

Such color signals, and vertical and horizontal synchronous signals, are supplied to the display apparatus by a video card. At this time, the video card supplies the color signals and vertical and horizontal synchronous signals to the display apparatus in a separate or composite form.

When the color signals and vertical and horizontal synchronous signals are applied in a separate form, they are called separate signals (referred to hereinafter as SEP signals). However, when the color signals and vertical and horizontal synchronous signals are applied in a composite form, they are called a composite signal.

Also, the composite signal is called a Sync On Video (SOV) signal when the display apparatus is of the mono type, and is called a Sync On Green (SOG) signal when the display apparatus is of the color type, because it is common that the vertical and horizontal synchronous signals be synthesized on the green signal of the color signals.

On the other hand, when the color signals and vertical and horizontal synchronous signals are applied in a separate or composite form as mentioned above, an OSD vertical blanking signal is supplied to the OSD circuit to display an OSD signal indicative of the operated and controlled states of the display apparatus in a video scanning interval.

As explained in more detail below, the OSD vertical blanking signal is typically supplied to an OSD circuit in three forms. That is, it can be provided by a vertical deflection circuit in the form of a vertical blanking signal, it can be provided by a video card as a vertical synchronous signal, or it can be provided by a microcomputer as a vertical synchronous signal.

Notably, when the color signals and vertical and horizontal synchronous signals are applied in a separate form, the OSD vertical blanking signal is available to the OSD circuit without any problem. However, when color signals and vertical and horizontal synchronous signals are applied in a composite form, horizontal noise is introduced into the OSD vertical blanking signal. This results in an OSD picture bounding phenomenon, wherein the OSD picture is vertically bounded at a particular frequency or position.

Therefore, there has been a need for the development of an OSD vertical blanking signal selection circuit for a display apparatus which is capable of avoiding the above problem. More particularly, there has been a need for the development of an OSD vertical blanking signal selection circuit in which a microcomputer checks whether vertical and horizontal synchronous signals from a video card are provided as SEP signals or as an SOG signal, and which supplies the vertical synchronous signal from the video card or a vertical blanking signal from a vertical deflection circuit as an OSD vertical blanking signal to an OSD circuit in accordance with the results of the aforementioned checking operation, thereby overcoming the OSD picture bounding phenomenon in a multi-mode of operation.

The following patents are considered to be represented of the prior art, and are burdened by the disadvantages discussed above: U.S. Pat. No. 5,623,316 to Naito et al. entitled On-Screen Display Apparatus and On-screen Display Method, U.S. Pat. No. 5,589,883 to Ogino et al. entitled Cathode Ray Tube Display, U.S. Pat. No. 5,475,443 to Kwon entitled On-screen Display Circuit of Imaging System, U.S. Pat. No. 5,325,183 to Rhee entitled Osd Circuit for Displaying Advertising Picture Data, U.S. Pat. No. 5,729,247 to Shibasaki entitled Screen Display Device, U.S. Pat. No. 4,291,336 to Shanley, II entitled Composite Keying Signal Generator for a Television Receiver and U.S. Pat. No. 4,263,610 to Shanley, II et al. entitled Controlled Output Composite Keying Signal Generatorfor a Television Receiver.

SUMMARY OF THE INVENTION

The present invention has been developed in view of the above problem, and it is an object of the present invention to provide an OSD vertical blanking signal selection circuit for a display apparatus, in which a microcomputer checks whether vertical and horizontal synchronous signals from a video card are SEP signals or an SOG signal, and supplies the vertical synchronous signal from the video card or a vertical blanking signal from a vertical deflection circuit as an OSD vertical blanking signal to an OSD circuit in accordance with the checked result to overcome the OSD picture bounding phenomenon in a multi-mode of operation.

In accordance with the present invention, the above and other objects can be accomplished by provision of an OSD vertical blanking signal selection circuit for a display apparatus. The circuit comprises: a microcomputer for generating a reference oscillating signal in response to vertical and horizontal synchronous signals from a video card, the microcomputer checking whether color signals and the vertical and horizontal synchronous signals from the video card are supplied in separate or composite form, and generating a control signal in accordance with the checked result; an HV processor for generating a flyback transformer (FBT) drive signal and horizontal and vertical drive signals in response to the reference oscillating signal from the microcomputer and the horizontal and vertical synchronous signals from the video card; an FBT for generating a high voltage in response to the FBT drive signal from the HV processor and supplying the generated high voltage to a cathode ray tube; a horizontal deflection circuit for controlling horizontal deflection of electron beams being scanned in the cathode ray tube in response to the horizontal drive signal from the HV processor; a vertical deflection circuit for controlling vertical deflection of the electron beams being scanned in the cathode ray tube in response to the vertical drive signal from the HV processor; and OSD vertical blanking signal selection means for supplying the vertical synchronous signal from the video card or a vertical blanking signal from the vertical deflection circuit as an OSD vertical blanking signal to an OSD circuit in response to the control signal from the microcomputer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1A:
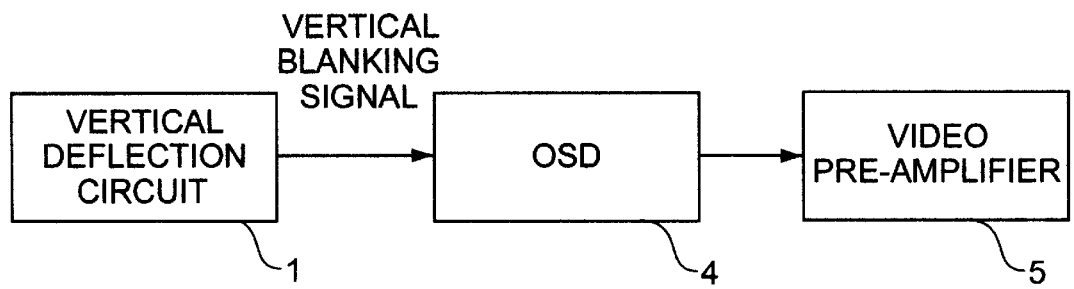
FIGS. 1A to 1C are block diagrams illustrating examples where an OSD vertical blanking signal is supplied to an OSD circuit.
Figure 1B:
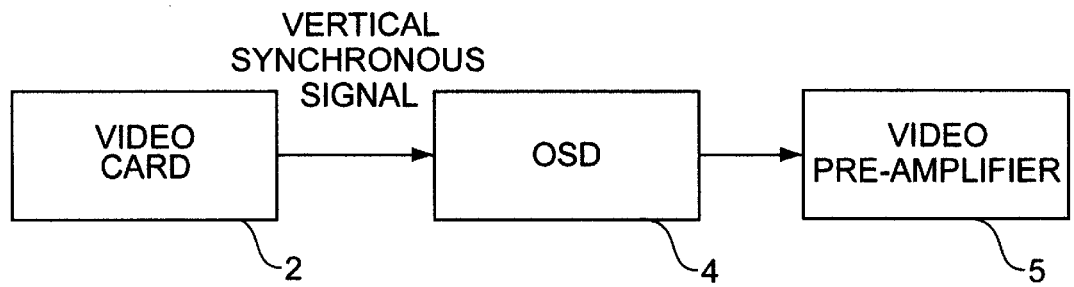
Figure 1C:
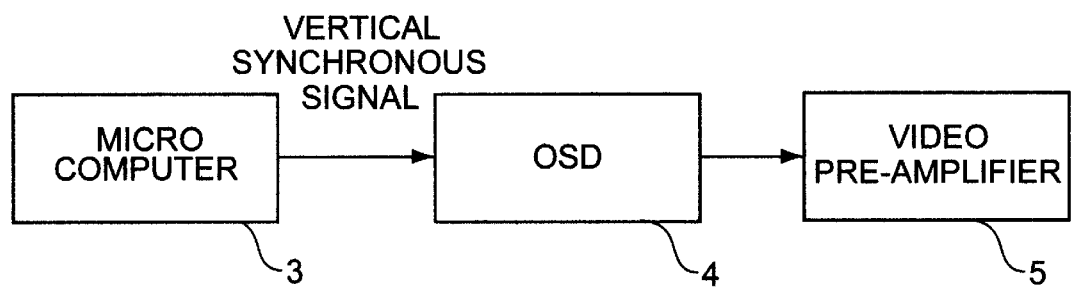

FIGS. 1A to 1C are block diagrams illustrating examples where an OSD vertical blanking signal is supplied to an OSD circuit.

The OSD vertical blanking signal is supplied to the OSD circuit in three forms, as shown in FIGS. 1A to 1C. The reference numeral 4 designates an OSD circuit and the reference numeral 2 designates a video card.

As shown in FIG. 1A, a vertical blanking signal from a vertical deflection circuit 1 is supplied as the OSD vertical blanking signal to the OSD circuit 4 which then outputs the OSD signal to a video pre-amplifier 5 in response to the supplied vertical blanking signal.

As shown in FIG. 1B, the OSD circuit 4 receives the vertical synchronous signal from the video card 2 as the OSD vertical blanking signal, and outputs the OSD signal to the pre-amplifier 5 in response to the received vertical synchronous signal.

As shown in FIG. 1C, the OSD circuit 4 receives a vertical synchronous signal from a microcomputer 3 as the OSD vertical blanking signal, and outputs the OSD signal to the pre-amplifier 5 in response to the received vertical synchronous signal.

Notably, when the color signals and vertical and horizontal synchronous signals are applied in a separate form (namely, as SEP signals), the OSD vertical blanking signal supplied to the OSD circuit is available with no problem. However, when the color signals and vertical and horizontal synchronous signals are applied in a composite form (namely, as an SOG signal), horizontal noise is introduced into the OSD vertical blanking signal, resulting in an OSD picture bounding phenomenon, wherein the OSD picture is vertically bounded at a particular frequency or position.

Figure 2:
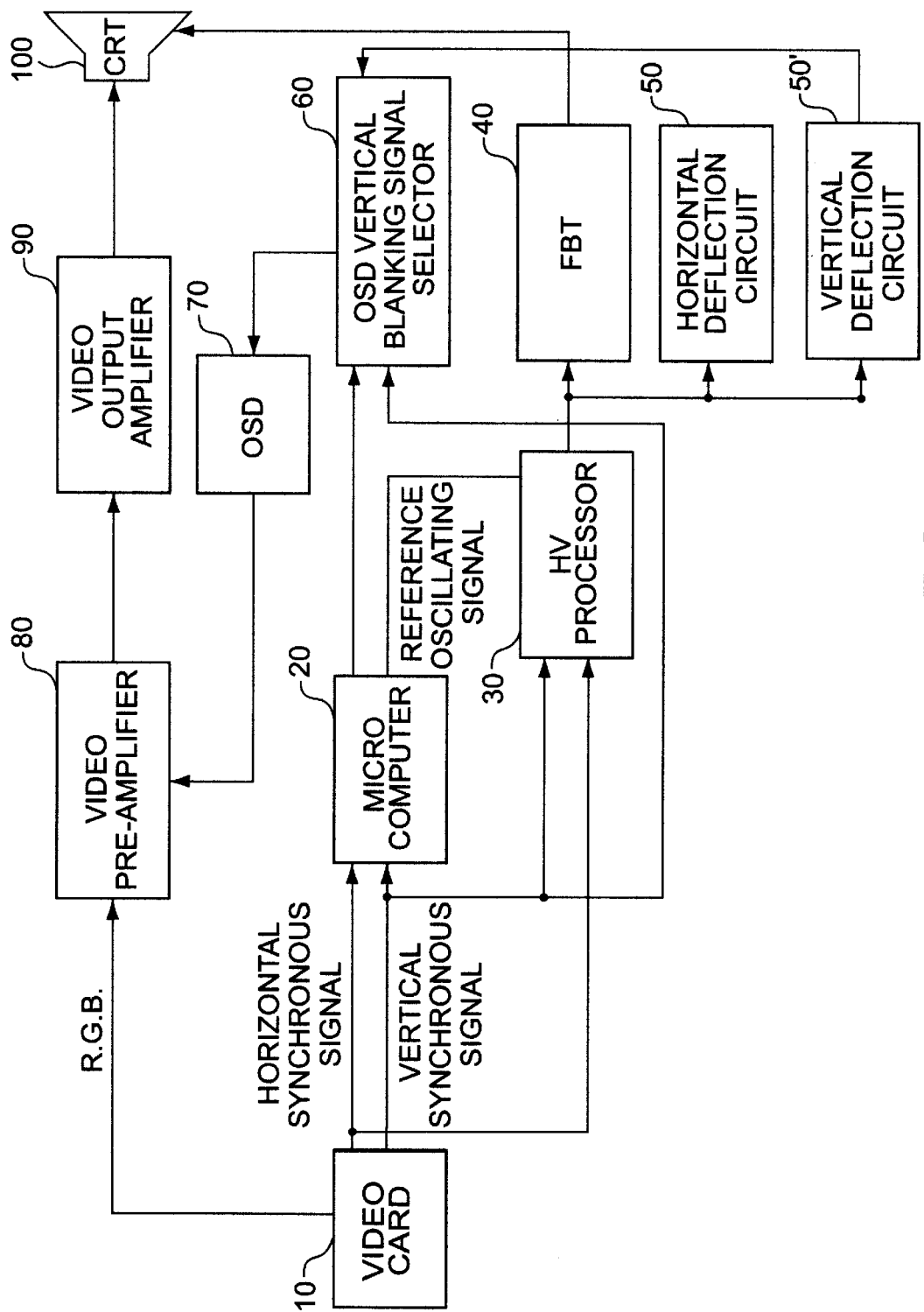
FIG. 2 is a block diagram illustrating a part of a display apparatus to which an OSD vertical blanking signal selection circuit of the present invention is applied.

FIG. 2 is a block diagram illustrating a part of a display apparatus to which an OSD vertical blanking signal selection circuit of the present invention is applied. In this drawing, the reference numeral 10 designates a video card for outputting color signals and vertical and horizontal synchronous signals.

A microcomputer 20 is adapted to generate a reference oscillating signal in response to the vertical and horizontal synchronous signals from the video card 10. An HV processor 30 is adapted to generate an FBT drive signal and horizontal and vertical drive signals in response to the reference oscillating signal from the microcomputer 20 and the horizontal and vertical synchronous signals from the video card 10. An FBT 40 generates a high voltage in response to the FBT drive signal from the HV processor 30 and supplies the generated high voltage to a cathode ray tube (referred to hereinafter as CRT) 100. Horizontal and vertical deflection circuits 50 and 50', respectively, control horizontal and vertical deflections, respectively, of electron beams being scanned on the CRT 100 in response to the horizontal and vertical drive signals from the HV processor 30.

The microcomputer 20 checks whether the color signals and vertical and horizontal synchronous signals from the video card 10 are SEP signals or an SOG signal, and generates a control signal in accordance with the checked result. An OSD vertical blanking signal selector 60 is adapted to supply the vertical synchronous signal from the video card 10 or a vertical blanking signal from the vertical deflection circuit 50' as an OSD vertical blanking signal in response to the control signal from the microcomputer 20. An OSD circuit 70 is adapted to output an OSD signal to a video pre-amplifier 80 in response to the OSD vertical blanking signal from the OSD vertical blanking signal selector 60.

The video pre-amplifier 80 pre-amplifies the R, G and B signals from the video card 10 and the OSD signal from the OSD circuit 70. A video output amplifier 90 amplifies an output signal from the video pre-amplifier 80 and supplies the amplified signal to the CRT 100.

The OSD signal indicates the operated and controlled states of the display apparatus, and the OSD vertical blanking signal is supplied to the OSD circuit 70 under the control of the microcomputer 20 to display the OSD signal in a video scanning interval.

Upon receiving the SEP signals from the video card 10, the microcomputer 20 controls the OSD vertical blanking signal selector 60 to supply the vertical synchronous signal from the video card 10 as the OSD vertical blanking signal to the OSD circuit 70. However, upon receiving the SOG signal from the video card 10, the microcomputer 20 controls the OSD vertical blanking signal selector 60 to supply the vertical blanking signal from the vertical deflection circuit 50' as the OSD vertical blanking signal to the OSD circuit 70.

Figure 3:
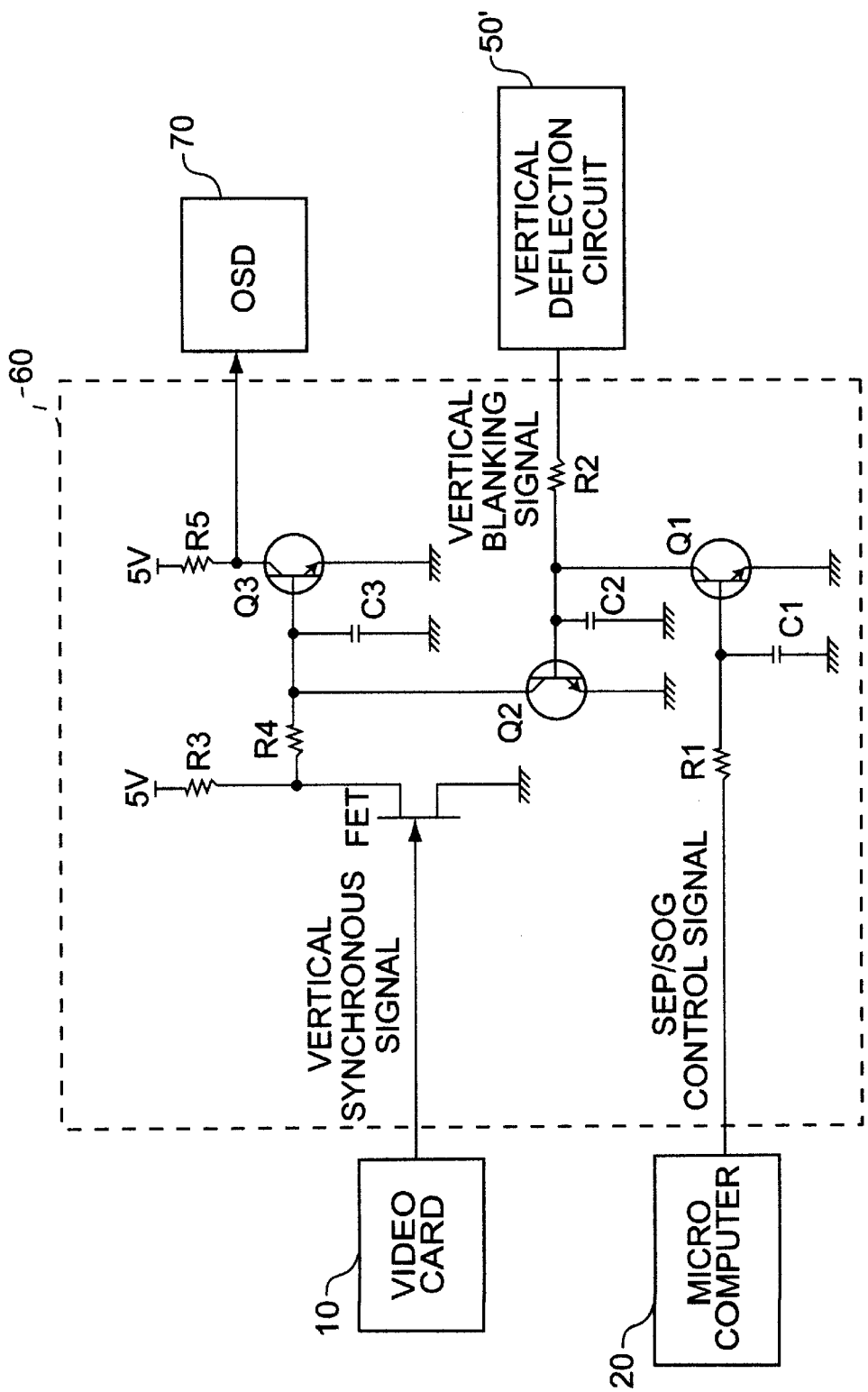
FIG. 3 is a circuit diagram illustrating an embodiment of an OSD vertical blanking signal selector in FIG. 2 in accordance with the present invention.

FIG. 3 is a circuit diagram illustrating an embodiment of the OSD vertical blanking signal selector 60 in FIG. 2 in accordance with the present invention. As shown in this drawing, the OSD vertical blanking signal selector 60 includes a first transistor QI having its base terminal connected to an SEP/SOG control signal output terminal of the microcomputer 20 and its emitter terminal connected to a ground voltage terminal.

A second transistor Q2 has its base terminal connected in common to a vertical blanking signal output terminal of the vertical deflection circuit 50' and to a collector terminal of the first transistor Q1, and its emitter terminal connected to the ground voltage terminal.

A field effect transistor FET has its gate terminal connected to a vertical synchronous signal output terminal of the video card 10, its drain terminal connected to a supply voltage terminal of 5 V and its source terminal connected to the ground voltage terminal.

A third transistor Q3 has its base terminal connected in common to the drain terminal of the field effect transistor FET and to a collector terminal of the second transistor Q2, its collector terminal connected in common to the supply voltage terminal of 5 V and to an OSD vertical blanking signal input terminal of the OSD circuit 70, and its emitter terminal connected to the ground voltage terminal.

In FIG. 3, the reference numerals R1–R5 designate resistors and the reference numerals C1–C3 designate capacitors.

The operation of the OSD vertical blanking signal selector 60 in accordance with the present invention will hereinafter be described in detail.

First, the microcomputer 20 checks whether the output signals from the video card 10 are SEP signals or an SOG signal. If the output signals from the video card 10 are SEP signals, the microcomputer 20 outputs a high level signal at its SEP/SOG control signal output terminal, which is then applied to the base terminal of the first transistor Q1. As a result, the first transistor Q1 is turned on.

As the first transistor Q1 is turned on, the vertical blanking signal from the vertical deflection circuit 50' is transferred to the ground voltage terminal through the collector and emitter terminals of the first transistor Q1, thereby causing the second transistor Q2 to be turned off. As a result, the field effect transistor FET and third transistor Q3 are driven by the vertical synchronous signal from the video card 10 to supply that vertical synchronous signal as the OSD vertical blanking signal to the OSD circuit 70.

On the other hand, in the case where the output signals from the video card 10 are an SOG signal, the microcomputer 20 outputs a low level signal at its SEP/SOG control signal output terminal, which is then applied to the base terminal of the first transistor Q1. As a result, the first transistor Q1 is turned off.

As the first transistor Q1 is turned off, the second and third transistors Q2 and Q3 are driven by the vertical blanking signal from the vertical deflection circuit 50' to supply that vertical blanking signal as the OSD vertical blanking signal to the OSD circuit 70.

At this time, the field effect transistor FET is turned off because no vertical synchronous signal is provided from the vertical synchronous signal output terminal of the video card 10.

As is apparent from the above description, according to the present invention, the microcomputer 20 checks whether the color signals and vertical and horizontal synchronous signals from the video card 10 are SEP signals or an SOG signal, and generates a control signal in accordance with the checked result. In response to a control signal from the microcomputer 20, the OSD vertical blanking signal selector 60 supplies the vertical synchronous signal from the video card 10 or the vertical blanking signal from the vertical deflection circuit 50' as the OSD vertical blanking signal to the OSD circuit 70. Therefore, the present invention has the effect of overcoming an OSD picture bounding phenomenon in a multi-mode.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An on-screen display (OSD) vertical blanking signal selection circuit for a display apparatus which includes a video card, a cathode ray tube and an OSD circuit, said OSD vertical blanking signal selection circuit comprising:

microcomputer means for generating a reference oscillating signal in response to vertical and horizontal synchronous signals from said video card, said microcomputer means checking whether color signals and the vertical and horizontal synchronous signals from said video card are applied in a separate or composite form, and said microcomputer means generating a control signal in accordance with the checked result;

HV processor means for generating an FBT drive signal and horizontal and vertical drive signals in response to the reference oscillating signal from said microcomputer means and the horizontal and vertical synchronous signals from said video card;

generating means for generating a high voltage in response to the FBT drive signal from said HV processor means and for supplying the generated high voltage to said cathode ray tube;

horizontal deflection circuit means for controlling horizontal deflection of electron beams in said cathode ray tube in response to the horizontal drive signal from said HV processor means;

vertical deflection circuit means for controlling vertical deflection of the electron beams in said cathode ray tube in response to the vertical drive signal from said HV processor means; and OSD vertical blanking signal selection means for selectively supplying the vertical synchronous signal from said video card and a vertical blanking signal from said vertical deflection circuit means as an OSD vertical blanking signal to said OSD circuit in response to the control signal from said microcomputer means;

wherein said OSD vertical blanking signal selection means comprises;

a first transistor having its base terminal connected to a control signal output terminal of said microcomputer means, and having its emitter terminal connected to a ground voltage terminal;

a second transistor having its base terminal connected in common to a vertical blanking signal output terminal of said vertical deflection circuit means and to a collector terminal of said first transistor, and having its emitter terminal connected to said ground voltage terminal;

a field effect transistor having its gate terminal connected to a vertical synchronous signal output terminal of said video card, its drain terminal connected to a supply voltage terminal, and its source terminal connected to said ground voltage terminal; and a third transistor having its base terminal connected in common to said drain terminal of said field effect transistor and to a collector terminal of said second transistor, its collector terminal connected in common to said supply voltage terminal and to an OSD vertical blanking signal input terminal of said OSD circuit, and its emitter terminal connected to said ground voltage terminal.

2. An OSD vertical blanking signal selection circuit for a display apparatus as set forth in claim 1, wherein said OSD vertical blanking signal selection means supplies the vertical synchronous signal from said video card as the OSD vertical blanking signal to said OSD circuit when the color signals and the vertical and horizontal synchronous signals from said video card are applied in the separate form to said microcomputer means, and wherein said OSD vertical blanking signal selection means supplies the vertical blanking signal from said vertical deflection circuit means as the OSD vertical blanking signal to said OSD circuit when the color signals and the vertical and horizontal synchronous signals from said video card are applied in the composite form to said microcomputer means.

3. An on-screen display (OSD) vertical blanking signal selection circuit for a display apparatus which includes a video card, a cathode ray tube and an OSD circuit, said OSD vertical blanking signal selection circuit comprising:

microcomputer means responsive to horizontal and vertical synchronous signals from said video card for determining whether color signals and the vertical and horizontal synchronous signals from said video card are provided in a separate form or in a composite form, said microcomputer means generating an output signal, said microcomputer means further generating a first control signal when said color signals and the vertical and horizontal synchronous signals from said video card are provided in the separate form, and generating a second control signal when the color signals and the vertical and horizontal synchronous signals from said video card are provided in the composite form;

vertical blanking signal generating means responsive to said output signal from said microcomputer means for generating a vertical blanking signal; and OSD vertical blanking signal selection means responsive to said first control signal from said microcomputer means for supplying the vertical synchronous signal from said video card as an OSD vertical blanking signal to said OSD circuit, and being responsive to said second control signal from said microcomputer means for providing the vertical blanking signal from said vertical blanking signal generating means as the OSD vertical blanking signal to said OSD circuit;

wherein said OSD vertical blanking signal selection means comprises a first transistor having its base terminal connected to said microcomputer means, and having its emitter terminal connected to a ground voltage terminal.

4. An OSD vertical blanking signal selection circuit for a display apparatus as set forth in claim 3, wherein said OSD vertical blanking signal selection means further comprises:

a second transistor having its base terminal connected in common to said vertical blanking signal generating means and to a collector terminal of said first transistor, and having its emitter terminal connected to said ground voltage terminal.

5. An OSD vertical blanking signal selection circuit for a display apparatus as set forth in claim 4, wherein said OSD vertical blanking signal selection means further comprises:

a field effect transistor having its gate terminal connected to a vertical synchronous signal output terminal of said video card, its drain terminal connected to a supply voltage terminal, and its source terminal connected to said ground voltage terminal.

6. An OSD vertical blanking signal selection circuit for a display apparatus as set forth in claim 5, wherein said OSD vertical blanking signal selection means further comprises:

a third transistor having its base terminal connected in common to said drain terminal of said field effect transistor and to a collector terminal of said second transistor, its collector terminal connected in common to said supply voltage terminal and to an OSD vertical blanking signal input terminal of said OSD circuit, and its emitter terminal connected to said ground voltage terminal.

7. An OSD vertical blanking signal selection circuit for a display apparatus which includes a video card, a cathode ray tube and an OSD circuit, said OSD vertical blanking signal selection circuit comprising:

microcomputer means responsive to horizontal and vertical synchronous signals from said video card for determining whether color signals and the vertical and horizontal synchronous signals from said video card are provided in a separate form or in a composite form, said microcomputer means generating an output signal, said microcomputer means further generating a first control signal when said color signals and the vertical and horizontal synchronous signals from said video card are provided in the separate form, and generating a second control signal when the color signals and the vertical and horizontal synchronous signals from said video card are provided in the composite form;

vertical blanking signal generating means responsive to said output signal from said microcomputer means for generating a vertical blanking signal; and OSD vertical blanking signal selection means responsive to said first control signal from said microcomputer means for supplying the vertical synchronous signal from said video card as an OSD vertical blanking signal to said OSD circuit, and being responsive to said second control signal from said microcomputer means for providing the vertical blanking signal from said vertical blanking signal generating means as the OSD vertical blanking signal to said OSD circuit;

wherein said vertical blanking signal generating means comprises a processor for generating a flyback transformer drive signal and horizontal and vertical drive signals in response to said output signal from said microcomputer means and in response to the horizontal and vertical synchronous signals from said video card.

8. An OSD vertical blanking signal selection circuit for a display apparatus as set forth in claim 7, further comprising a horizontal deflection circuit connected to said processor for controlling horizontal deflection of electron beams in said cathode ray tube in response to the horizontal drive signal from said processor, and a vertical deflection circuit for controlling vertical deflection of the electron beams in said cathode ray tube in response to the vertical drive signal from said processor.

9. An OSD vertical blanking signal selection circuit for a display apparatus as set forth in claim 8, wherein said vertical deflection circuit generates said vertical blanking signal, and provides said vertical blanking signal to said OSD vertical blanking signal selection means.

10. An OSD vertical blanking signal selection circuit for a display apparatus as set forth in claim 7, further comprising flyback transformer means connected to said processor for receiving the flyback transformer drive signal therefrom, said flyback transformer means being further connected to said cathode ray tube for providing a high voltage output thereto.

11. An OSD vertical blanking signal selection circuit for a display apparatus which includes a video card, a cathode ray tube and an OSD circuit, said OSD vertical blanking signal selection circuit comprising:

microcomputer means responsive to horizontal and vertical synchronous signals from said video card for determining whether color signals and the vertical and horizontal synchronous signals from said video card are provided in a separate form or in a composite form, said microcomputer means generating an output signal, said microcomputer means further generating a first control signal when said color signals and the vertical and horizontal synchronous signals from said video card are provided in the separate form, and generating a second control signal when the color signals and the vertical and horizontal synchronous signals from said video card are provided in the composite form;

vertical blanking signal generating means responsive to said output signal from said microcomputer means for generating a vertical blanking signal; and OSD vertical blanking signal selection means responsive to said first control signal from said microcomputer means for supplying the vertical synchronous signal from said video card as an OSD vertical blanking signal to said OSD circuit, and being responsive to said second control signal from said microcomputer means for providing the vertical blanking signal from said vertical blanking signal generating means as the OSD vertical blanking signal to said OSD circuit;

further comprising pre-amplifier means connected to said video card for receiving color signals therefrom, and for pre-amplifying said color signals to provide an amplification output, said pre-amplifier means being connected to said OSD circuit for receiving an OSD output signal therefrom indicating operational and controlled states of said display apparatus.

12. An OSD vertical blanking signal selection circuit for a display apparatus as set forth in claim 11, further comprising output amplifier means connected between said pre-amplifier means and said cathode ray tube for receiving said amplification output of said pre-amplifier means, and for further amplifying said amplification output to obtain an amplifier output signal, said amplifier output signal being provided as an input to said cathode ray tube.

13. An on-screen display (OSD) vertical blanking signal selection circuit for a display apparatus which includes a video card, a cathode ray tube and an OSD circuit, said OSD vertical blanking signal selection circuit comprising:

microcomputer means responsive to horizontal and vertical synchronous signals from said video card for determining whether color signals and the vertical and horizontal synchronous signals from said video card are provided in a separate form or in a composite form, said microcomputer means generating an output signal, said microcomputer means further generating a first control signal when said color signals and the vertical and horizontal synchronous signals from said video card are provided in the separate form, and generating a second control signal when the color signals and the vertical and horizontal synchronous signals from said video card are provided in the composite form;

vertical blanking signal generating means responsive to said output signal from said microcomputer means for generating a vertical blanking signal; and OSD vertical blanking signal selection means responsive to said first control signal from said microcomputer means for supplying the vertical synchronous signal from said video card as an OSD vertical blanking signal to said OSD circuit, and being responsive to said second control signal from said microcomputer means for providing the vertical blanking signal from said vertical blanking signal generating means as the OSD vertical blanking signal to said OSD circuit.

14. An OSD vertical blanking signal selection circuit for a display apparatus as set forth in claim 13, wherein said OSD vertical blanking signal selection means comprises:

a first transistor having its base terminal connected to said microcomputer means, and having its emitter terminal connected to a ground voltage terminal.

15. An OSD vertical blanking signal selection circuit for a display apparatus as set forth in claim 14, wherein said OSD vertical blanking signal selection means further comprises:

a second transistor having its base terminal connected in common to said vertical blanking signal generating means and to a collector terminal of said first transistor, and having its emitter terminal connected to said ground voltage terminal.

16. An OSD vertical blanking signal selection circuit for a display apparatus as set forth in claim 15, wherein said OSD vertical blanking signal selection means further comprises:

a field effect transistor having its gate terminal connected to a vertical synchronous signal output terminal of said video card, its drain terminal connected to a supply voltage terminal, and its source terminal connected to said ground voltage terminal.

17. An OSD vertical blanking signal selection circuit for a display apparatus as set forth in claim 16, wherein said OSD vertical blanking signal selection means further comprises:

a third transistor having its base terminal connected in common to said drain terminal of said field effect transistor and to a collector terminal of said second transistor, its collector terminal connected in common to said supply voltage terminal and to an OSD vertical blanking signal input terminal of said OSD circuit, and its emitter terminal connected to said ground voltage terminal.

18. An OSD vertical blanking signal selection circuit for a display apparatus in set forth in claim 13, wherein said vertical blanking signal generating means comprises a processor for generating a flyback transformer drive signal and horizontal and vertical drive signals in response to said output signal from said microcomputer means and in response to the horizontal and vertical synchronous signals from said video card.

19. An OSD vertical blanking signal selection circuit for a display apparatus as set forth in claim 18, further comprising a horizontal deflection circuit connected to said processor for controlling horizontal deflection of electron beams in said cathode ray tube in response to the horizontal drive signal from said processor, and a vertical deflection circuit for controlling vertical deflection of the electron beams in said cathode ray tube in response to the vertical drive signal from said processor.

20. An OSD vertical blanking signal selection circuit for a display apparatus as set forth in claim 19, wherein said vertical deflection circuit generates said vertical blanking signal, and provides said vertical blanking signal to said OSD vertical blanking signal selection means.

21. An OSD vertical blanking signal selection circuit for a display apparatus as set forth in claim 18, further comprising flyback transformer means connected to said processor for receiving the flyback transformer drive signal therefrom, said flyback transformer means being further connected to said cathode ray tube for providing a high voltage output thereto.

22. An OSD vertical blanking signal selection circuit for a display apparatus in set forth in claim 13, further comprising pre-amplifier means connected to said video card for receiving color signals therefrom, and for pre-amplifying said color signals to provide an amplification output, said pre-amplifier means being connected to said OSD circuit for receiving an OSD output signal therefrom indicating operational and controlled states of said display apparatus.

23. An OSD vertical blanking signal selection circuit for a display apparatus as set forth in claim 22, further comprising output amplifier means connected between said pre-amplifier means and said cathode ray tube for receiving said amplification output of said pre-amplifier means, and for further amplifying said amplification output to obtain an amplifier output signal, said amplifier output signal being provided as an input to said cathode ray tube.

* * * * *